US011213079B2

(12) United States Patent
Marks

(10) Patent No.: US 11,213,079 B2
(45) Date of Patent: Jan. 4, 2022

(54) MULTI-RIDER VEHICLE RETENTION APPAREL

(71) Applicant: Dale Lafayette Marks, Long Beach, CA (US)

(72) Inventor: Dale Lafayette Marks, Long Beach, CA (US)

(*) Notice: Subject to any disclaimer, the term of this patent is extended or adjusted under 35 U.S.C. 154(b) by 89 days.

(21) Appl. No.: 16/839,699

(22) Filed: Apr. 3, 2020

(65) Prior Publication Data
US 2020/0315268 A1 Oct. 8, 2020

Related U.S. Application Data

(60) Provisional application No. 62/829,414, filed on Apr. 4, 2019.

(51) Int. Cl.
*A41D 13/00* (2006.01)
*A41D 19/015* (2006.01)
*B62J 27/00* (2020.01)

(52) U.S. Cl.
CPC ... *A41D 13/0007* (2013.01); *A41D 19/01552* (2013.01); *B62J 27/00* (2013.01); *A41D 2600/102* (2013.01)

(58) Field of Classification Search
CPC ......... A41D 19/01552; A41D 2600/102; B62J 27/00; A63B 2209/10
See application file for complete search history.

(56) References Cited

U.S. PATENT DOCUMENTS

| | | | | |
|---|---|---|---|---|
| 3,348,238 A | | 10/1966 | Hydock | |
| 3,840,902 A | * | 10/1974 | McNeill | B62J 27/00 2/311 |
| 3,896,499 A | * | 7/1975 | Kelly | A41F 9/005 2/311 |
| 3,940,166 A | * | 2/1976 | Smithea | B60R 22/00 297/215.11 |
| 4,028,742 A | * | 6/1977 | Marquis | A41F 9/005 2/305 |
| 4,324,205 A | * | 4/1982 | Goldmacher | B60R 22/00 2/300 |
| 4,411,222 A | * | 10/1983 | Wolfson | A41F 9/005 2/300 |
| 4,429,419 A | * | 2/1984 | Snyder | A41D 13/0007 2/102 |
| 4,560,097 A | * | 12/1985 | Reynolds | A41D 13/0007 224/160 |
| 4,691,387 A | * | 9/1987 | Lopez | A41D 19/01547 2/159 |
| 5,081,719 A | * | 1/1992 | Donnelly | A41F 9/005 182/3 |
| 5,715,539 A | | 2/1998 | Benecki | |

(Continued)

*Primary Examiner* — F Griffin Hall
(74) *Attorney, Agent, or Firm* — Michael Christopher Balaguy

(57) ABSTRACT

A multi-rider vehicle retention apparel system includes a jacket and one or more gloves. The jacket includes loop fasteners on the front face of the jacket, on both the left and right sides. The gloves have palms covered with hook fasteners able to releasably attach to the loop fasteners on the jacket. In use, the jacket may be worn by a vehicle operator, and the gloves may be worn by a rider seated behind the operator. Using the gloves, the rider may be able to very securely hold onto the operator while riding on the vehicle, reducing fear of losing grip.

4 Claims, 4 Drawing Sheets

(56) References Cited

U.S. PATENT DOCUMENTS

| | | | |
|---|---|---|---|
| 6,427,248 B1 | 8/2002 | Albert | |
| 6,732,377 B1 | 5/2004 | Wilkinson | |
| 8,256,031 B2 * | 9/2012 | Von Kahle | B62J 27/00 2/311 |
| 10,259,518 B2 * | 4/2019 | Jarmon | A41D 1/02 |
| 2004/0025224 A1 | 2/2004 | Albert | |
| 2006/0254533 A1 * | 11/2006 | Fuller | A62B 35/0006 119/770 |
| 2009/0172861 A1 * | 7/2009 | Tomlinson | A41D 27/00 2/85 |
| 2010/0011483 A1 | 1/2010 | Pinkart | |
| 2013/0047314 A1 * | 2/2013 | Alvarado, Jr. | A41D 13/0002 2/93 |
| 2016/0278454 A1 * | 9/2016 | Lucas | A41D 13/0007 |

* cited by examiner

MULTI-RIDER VEHICLE RETENTION APPAREL

CROSS-REFERENCE TO RELATED APPLICATION(S)

The present application is related to and claims priority to U.S. Provisional Patent Application No. 62/829,414 filed Apr. 4, 2019, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of apparel of existing art and more specifically relates to a system of gloves and jackets for improving the grip of riders on a vehicle.

RELATED ART

One focus often pursued in the apparel industry is in aiding grip. Gloves, footwear, kneepads, and other wearable items may be augmented with rubber and other high-friction materials to improve a wearer's ability to avoid slippage and maintain grip on various items. Other solutions include forming discontinuous texture patterns on apparel items. Still, these solutions only improve friction between surfaces and do not enact positive engagement of apparel to particular items. There are cases in which such positive engagement would be desired; for example, in cases where a user is holding an object for extended periods of time while being subject to various external vibrations or forces. High-friction surfaces are not sufficient for such applications. A fulfilling solution is desired.

U.S. Pat. No. 6,427,248 to David M. Albert relates to a grip-enhancing glove. The described grip-enhancing glove includes gloves with control-enhancing material having a plurality of recesses, such as suction cups, positioned on the palm portion of the bowling glove. The areas covered by the control-enhancing material include the underside of the index finger, the underside of the thumb, the underside of the little finger, and the underside of the middle and ring fingers. Basically, the control-enhancing material is positioned at all or some of the areas on the glove that contact the bowling ball when the glove is worn on the hand of the user and the user is holding a bowling ball. The control-enhancing material works to grip the surface of the bowling ball by a suction force and a friction force. The additional grip is maintained even though the user moves his or her hand slightly either away from, towards, or laterally with respect to the bowling ball. This reference is representative of grip-aiding apparel. Yet, a more positively engaging solution is desired.

SUMMARY OF THE INVENTION

In view of the foregoing disadvantages inherent in the known apparel art, the present disclosure provides a novel multi-rider vehicle retention apparel. The general purpose of the present disclosure, which will be described subsequently in greater detail, is to provide a multi-rider vehicle retention apparel.

The disclosed multi-rider vehicle retention apparel includes a jacket and one or more gloves. The jacket includes loop fasteners on the front face of the jacket, on both the left and right sides. The gloves have palms covered with hook fasteners able to releasably attach to the loop fasteners on the jacket. In use, the jacket may be worn by a vehicle operator, and the gloves may be worn by a rider seated behind the operator. Using the gloves, the rider may be able to very securely hold onto the operator while riding on the vehicle, reducing fear of loosing grip. Most particularly, the system may be beneficial for use by two individuals riding a motorcycle.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the multi-rider vehicle retention apparel, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a grip-aiding apparel and more particularly to a multi-rider vehicle retention apparel as used to improve the ability of a rider on a vehicle to retain grip.

Generally, the apparel system may be a system of interacting jackets and gloves that are advantageous in providing additional grip to riders of a vehicle, and most particularly of a motorcycle. When a passenger rides behind an operator of a motorcycle, the only way to hold on is to wrap the passenger's arms around the torso of the operator. Improving the grip of the passenger around the operator may be accomplished by providing gloves worn by the passenger and a jacket worn by the operator, whereby the gloves and the jacket have corresponding hook-and-loop fasteners. In this way, the hook-and-loop fasteners aid the passenger in keeping grip on the operator. It has been found that placing fasteners on the front panels of the jacket are the optimal place for fastening the gloves in use. Such a placement is also advantageous because when a passenger is not using the gloves, the gloves may be stored by simply attaching them to the front of the jacket.

Referring now more specifically to the drawings by numerals of reference, there is shown in FIGS. 1-4, various views of an apparel system 100.

Figure 1:
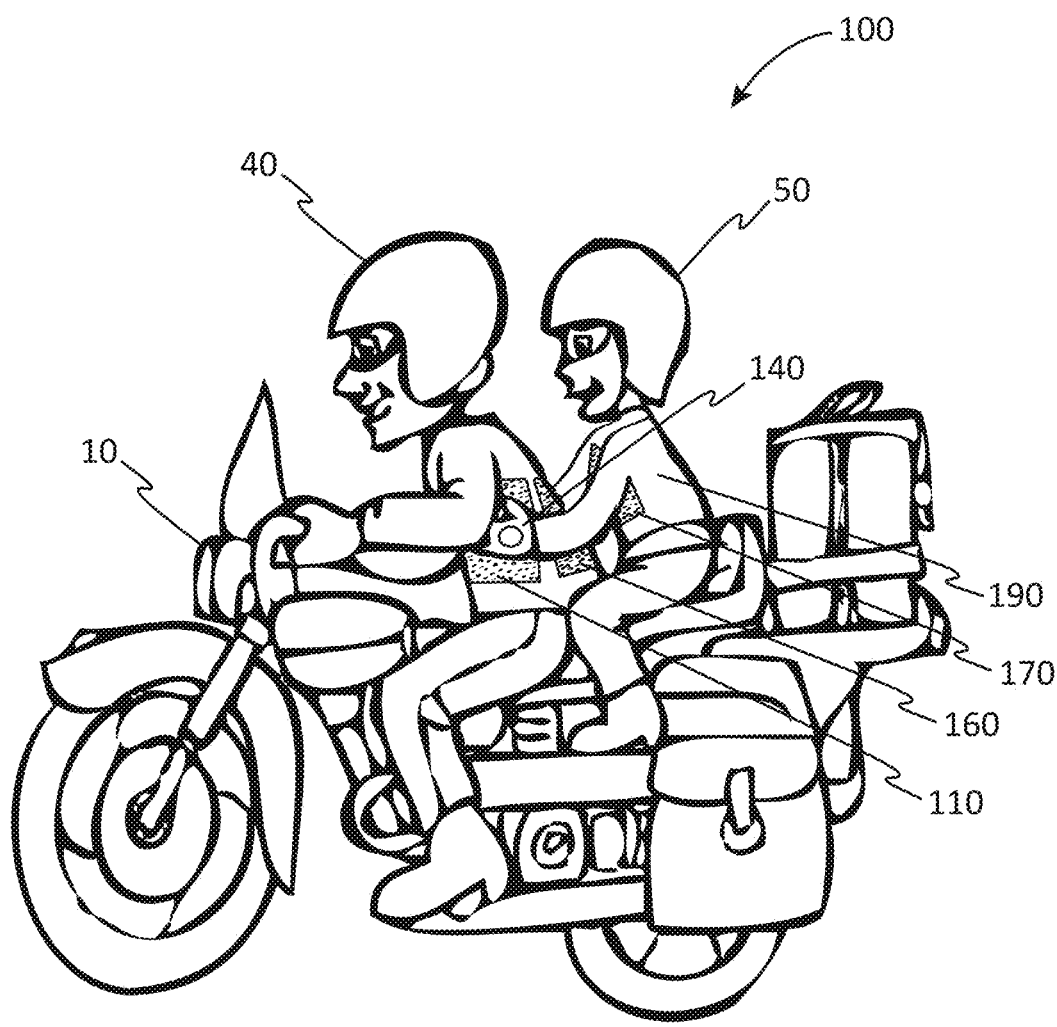
FIG. 1 is a perspective view of the apparel system during an 'in-use' condition, according to an embodiment of the disclosure.

FIG. 1 shows an apparel system during an 'in-use' condition, according to an embodiment of the present disclosure. Here, the apparel system may be beneficial for use by a user 40 to improve their grip while riding a vehicle such as a motorcycle. The apparel system 100 may include jacket 110 and at least one glove 140. Preferably, at least one glove 140 is a pair of gloves, having a right-handed glove and a left-handed glove. Apparel system 100 is advantageous for aiding a secondary rider on a vehicle, as apparel system 100 enables at least one glove 140 to releasably fasten to jacket 110. This may be accomplished by first-loop fastener 120 (FIG. 2) and second-loop fastener 130 (FIG. 2) on jacket 110 and hook-fastener 144 (FIG. 3) on at least one glove 140, as will be described in greater detail below. As shown, vehicle 10 may be operated by operator 40, and passenger 50 may be seated behind operator 40. Operator 40 may wear jacket 110 and passenger 50 may wear at least one glove 140. In such a situation, passenger 50 may increase their grip by fastening at least one glove 140 to jacket 110, as shown. Further, passenger 50 may wear passenger-jacket 190. Passenger-jacket 190 may attach to jacket 110 via third-loop-fastener 160 on jacket 110 and passenger-hook-fastener 170 on a front of passenger-jacket 190.

Figure 2:
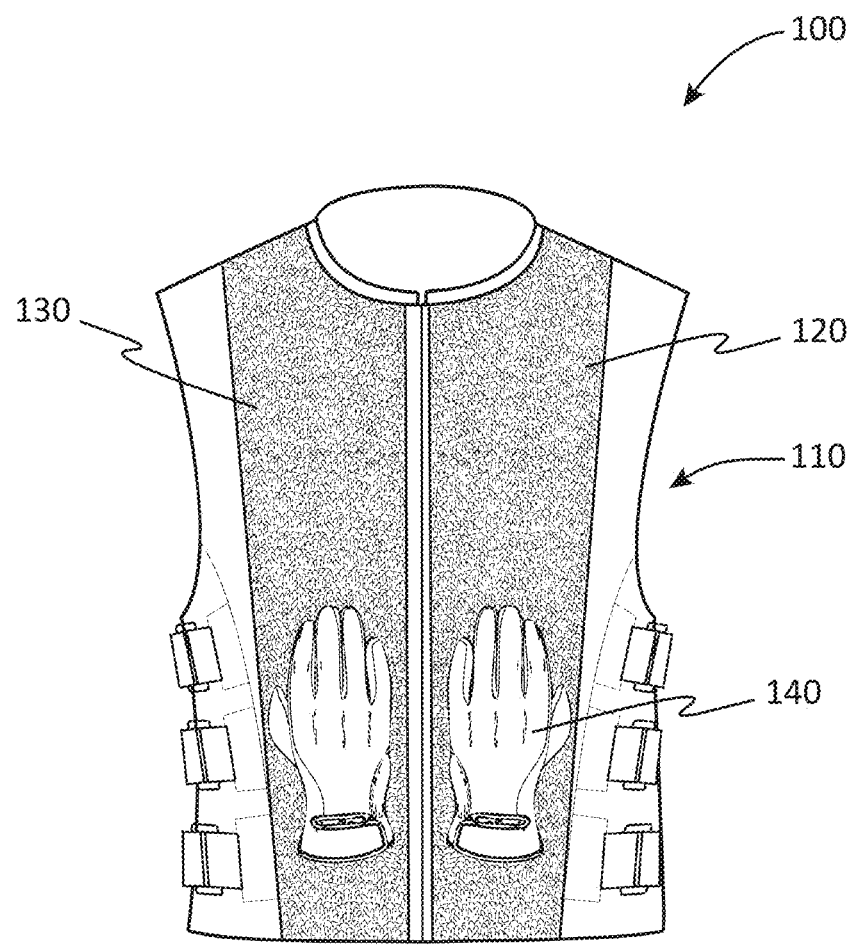
FIG. 2 is a perspective view of the jacket of the apparel system of FIG. 1, according to an embodiment of the present disclosure.

FIG. 2 shows the apparel system 100 of FIG. 1, according to an embodiment of the present disclosure. As above, the apparel system 100 may include jacket 110 and at least one glove 140. Jacket 110 may have first-loop-fastener 120 attached to the left-front of jacket 110, and second-loop fastener 130 attached to the right-front of jacket 110, such that first-loop-fastener 120 and second-loop fastener 130 may mirror each other. For the purposes of this specification, "left" and "right" are defined from the perspective of the wearer.

Figure 3:
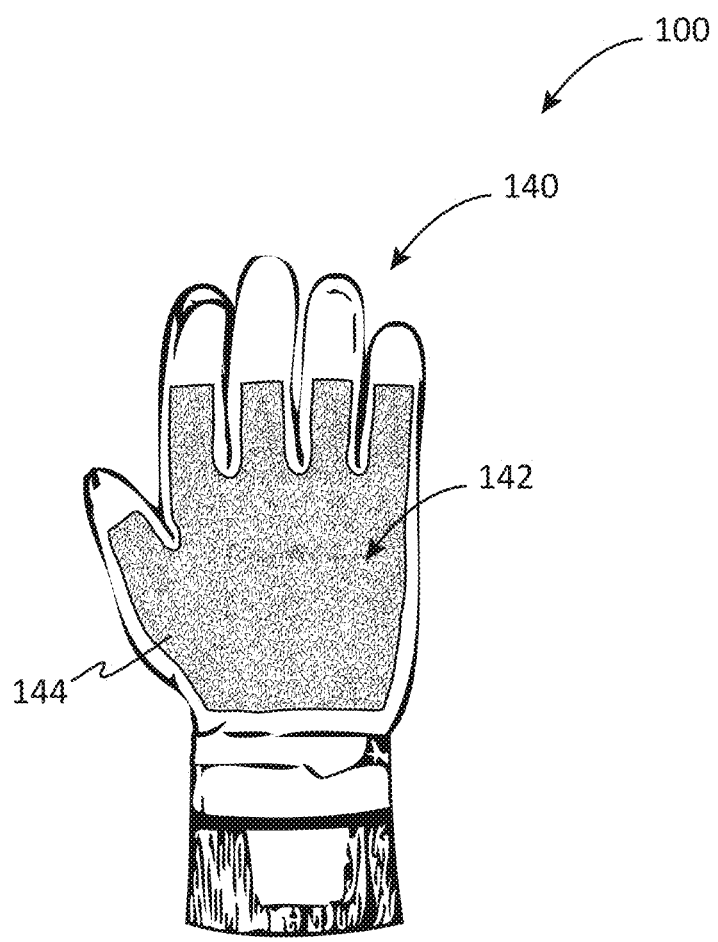
FIG. 3 is a perspective view of the glove of the apparel system of FIG. 1, according to an embodiment of the present disclosure.

FIG. 3 is a perspective view of the glove of the apparel system 100 of FIG. 1, according to an embodiment of the present disclosure. Each of at least one glove 140 may have hook-fastener 144 attached to palm-region 142 of each of at least one glove 140 such that hook-fastener 144, when interfaced with first-loop fastener 120 or second-loop fastener 130, releasably affixes palm-region 142 of one of at least one glove 140 to one of the left-front of jacket 110 and the right-front of jacket 110.

Figure 4:
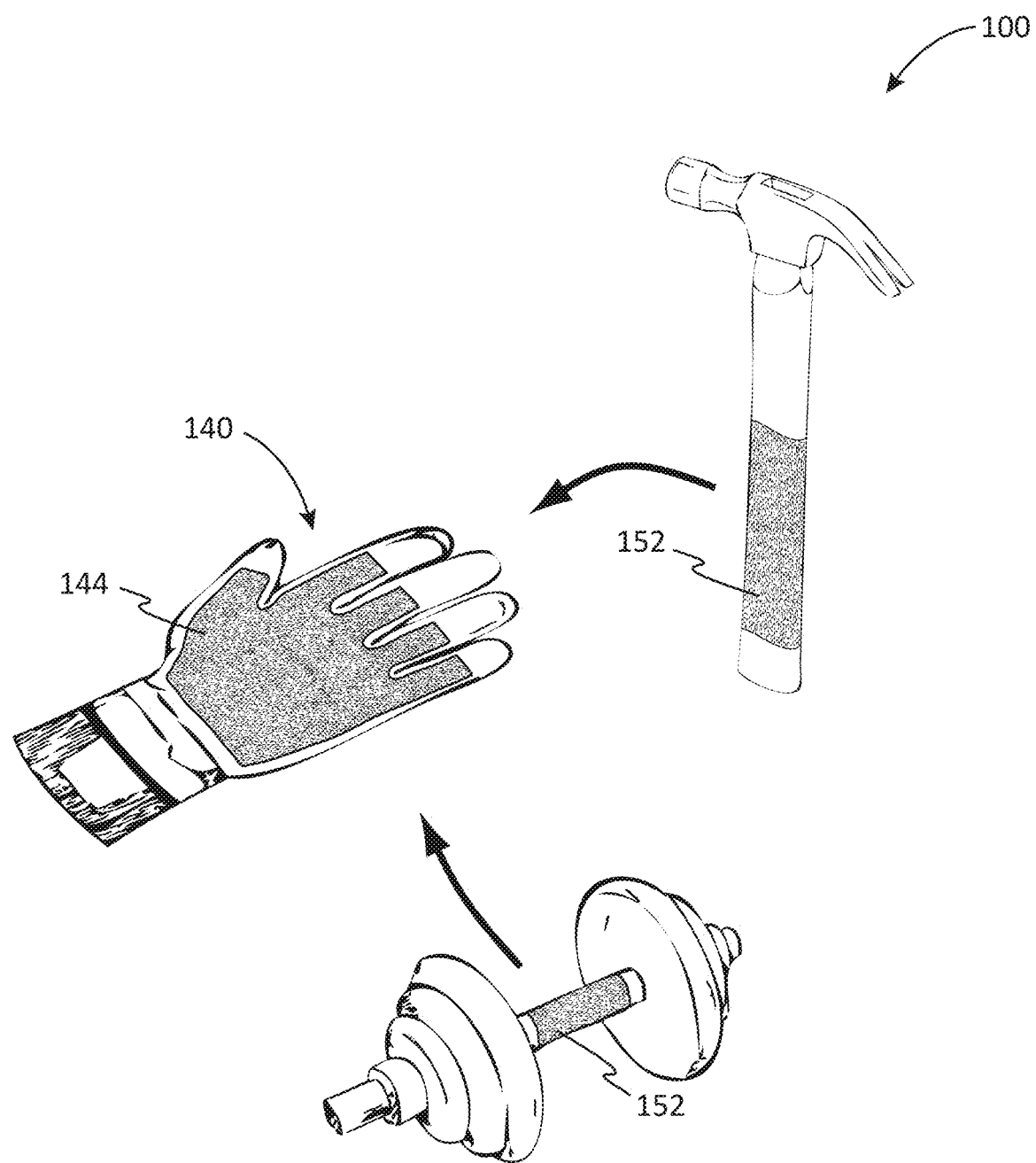
FIG. 4 is a perspective view of the apparel system of FIG. 1, according to an embodiment of the present disclosure.

FIG. 4 is a perspective view of the apparel system 100 of FIG. 1, according to an embodiment of the present disclosure. In some embodiments, apparel system 100 may further comprise at least one hand-grip 150, at least one hand-grip 150 having at least one grip-loop-fastener 152 circumscribing the hand-grip, such that hook-fastener 144, when interfaced with the grip-loop-fastener, releasably affixes palm-region 142 of one of at least one glove 140 to the grip-loop-fastener. Hand-grip 150 may be a vehicle grip, a tool-grip, or an alternative type of grip.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An apparel system for aiding a secondary rider on a vehicle, the apparel system comprising:
   an operator-jacket having
      a first-loop fastener attached to a left-front of the operator-jacket, and
      a second-loop fastener attached to a right-front of the operator-jacket;
   at least one glove, each of the at least one glove having
      a hook-fastener attached to a palm-region of each of the at least one glove;
         such that the hook-fastener, when interfaced with one of the first-loop fastener and the second-bop fastener, releasably affixes the palm-region of one of the at least one glove to one of the left-front of the operator-jacket and the right-front of the operator-jacket;
   a third-loop fastener disposed on a back of the operator-jacket; and
   a passenger-jacket having at least one passenger-hook fastener disposed on a front of the passenger-jacket;
      whereby the third-loop fastener releasably affixes to the passenger-hook fastener in order to grip the passenger-jacket to the operator-jacket.

2. The apparel system of claim 1, further comprising at least one hand-grip, the at least one hand-grip having at least one grip-loop fastener circumscribing the hand-grip, such that the hook-fastener, when interfaced with the grip-loop fastener, releasably affixes the palm-region of one of the at least one glove to the grip-loop-fastener.

3. The apparel system of claim 2, wherein the hand-grip is a vehicle grip.

4. The apparel system of claim 2, wherein the hand-grip is a tool-grip.

* * * * *